(12) United States Patent
Beadon

(10) Patent No.: US 6,569,273 B1
(45) Date of Patent: May 27, 2003

(54) PROCESS FOR MANUFACTURING FIBRE REINFORCED PLASTIC MASTS, SPARS OR COLUMNS

(76) Inventor: Cole H. Beadon, 25 Margaret Street, Alton, Ontario (CA), L0N 1A0

( * ) Notice: Subject to any disclaimer, the term of this patent is extended or adjusted under 35 U.S.C. 154(b) by 0 days.

(21) Appl. No.: 09/700,256
(22) PCT Filed: Nov. 6, 1998
(86) PCT No.: PCT/CA98/01029
§ 371 (c)(1),
(2), (4) Date: Nov. 13, 2000
(87) PCT Pub. No.: WO99/67079
PCT Pub. Date: Dec. 29, 1999

(30) Foreign Application Priority Data

Jun. 22, 1998 (CA) .............................. 2237736

(51) Int. Cl.7 ................................ B29C 70/30
(52) U.S. Cl. ................ 156/91; 156/110.1; 264/248; 264/249
(58) Field of Search ................ 264/248, 249; 156/110.1, 91

(56) References Cited

U.S. PATENT DOCUMENTS

| | | | | |
|---|---|---|---|---|
| 3,655,863 A | * | 4/1972 | Andersen et al. | 264/294 |
| 3,723,216 A | * | 3/1973 | Kirkwood | 156/110 |
| 3,782,856 A | * | 1/1974 | Salkind et al. | 416/226 |
| 3,895,835 A | * | 7/1975 | Thomson | 293/71 R |
| 3,956,447 A | * | 5/1976 | Denommee et al. | 264/135 |
| 3,967,996 A | * | 7/1976 | Kamov et al. | 156/156 |
| 4,452,658 A | * | 6/1984 | Schramm | 156/245 |
| 4,941,674 A | * | 7/1990 | Trimble | 280/281.1 |
| 5,350,556 A | * | 9/1994 | Abe et al. | 264/248 |
| 5,804,511 A | * | 9/1998 | Kelman et al. | 442/172 |
| 6,096,254 A | * | 8/2000 | Nielsen | 264/237 |

FOREIGN PATENT DOCUMENTS

JP      4-87855    *  3/1992   ........... B60R/19/03

OTHER PUBLICATIONS

Quilty, Carbon Masts, Aug. 1998, www.hqnorth.com/aug98/carbonmast.htm, 1–5.*
Callahan, Slick Sticks, Dec. 1998, Cruising World, p. 53–57.*
Spars process and development, www.c–spars.uk.com/, date unknown.*
Omohundro Company (Advertisement), North Marine, p. 8 and p. 15, date unknown.*

* cited by examiner

Primary Examiner—Deborah Jones
Assistant Examiner—Vivek Koppikar

(57) ABSTRACT

This is a process for laminating spars, masts or columns using fiber reinforced plastics such as carbon fiber/epoxy, using a concave or "U" shaped female mould. After curing, the "U" shaped section is removed from the mould and clamped so that the flanges meet or overlap and can be bonded and/or fastened together to form a closed section with the finished surface on the outside.

1 Claim, 3 Drawing Sheets

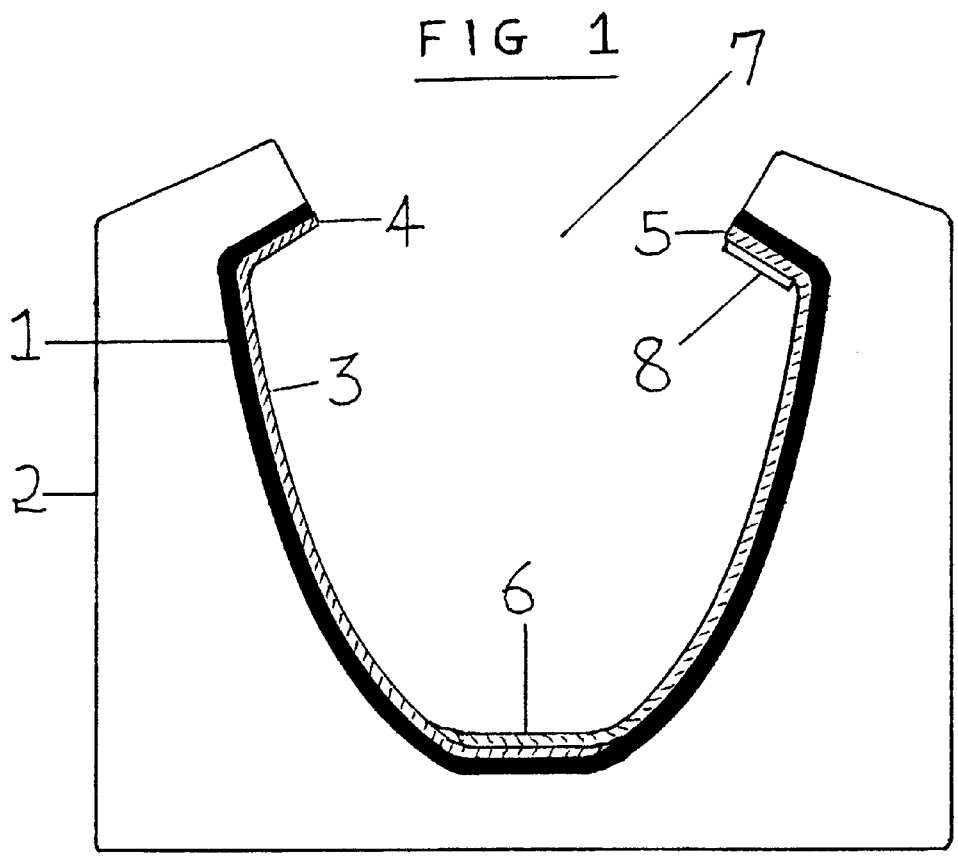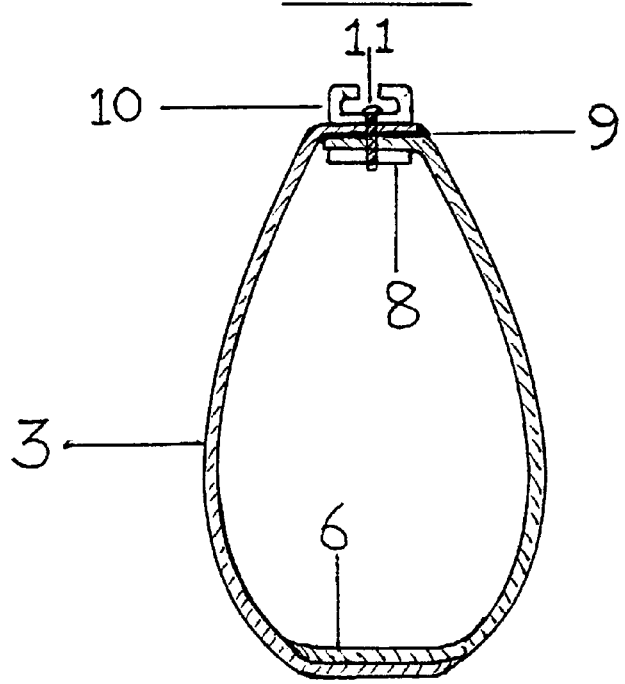

PROCESS FOR MANUFACTURING FIBRE REINFORCED PLASTIC MASTS, SPARS OR COLUMNS

This process relates to the production of light, high strength columns, masts or spars such as but not limited to those used in the sailboat industry, using fibre reinforced plastics such as carbon, Kevlar and glass fibres, impregnated with a bonding resin such as epoxy or polyester.

In general, fibre reinforced masts or spars such as those used in the sailboat industry are wound or moulded around a male mould or mandrel and require finishing on the outside which is labour intensive and therefore expensive. Alternatively, they are hand laid up as two or more separate parts using female moulds and later bonded longitudinally to form the closed section, a time consuming process that requires careful control to produce reliable bonded joints. In addition, both methods usually employ vacuum bagging and heat curing in large ovens or autoclaves further adding to the cost of production. (See document D1, section entitled Process and Development, in which the "two part female mould" method described is the closest to my method.)

My single, concave or "U" shaped, female mould method overcomes many of these problems by enabling the part to be moulded by the hand lay-up method or other conventional methods using cold or hot cure resins and makes it easy to vary the thickness, orientation and composition of the moulding without affecting the outside dimensions of the finished part.

The cross-section of the concave female mould required that will ultimately produce a closed finished section of the desired shape can be easily predetermined by calculation, trial and error, or more usually a combination of the two.

The single join required to produce the closed section is also relatively easy to effect and can be done in a number of different ways, some of which are illustrated here. In addition, before the cured part is clamped closed and bonded, inserts and backing plates can be bonded or fastened to the inside of the section to absorb localised loads that might be caused by fittings and fastenings such as spreaders, tangs, tracks or sheaves in the case of sailboat masts. Additional pieces such as conduit for wiring can also be added at this stage.

Furthermore, if a coloured gel-coating is used against the mould surface, the part will not require painting and in the example illustrated will need only a small amount of finishing work along one edge of the bonded joint. Alternatively, a sail track or similar, that is to be fastened over the joint can be so shaped as to hide the unfinished edge further reducing finishing time.

Yet another advantage of this method, is that the clamping together of the "U" section pre-stresses the walls thereby increasing their resistance to buckling.

Document D1, Reflecting Prior Art

D1: C-Spars (U.K.): Section entitled Process and Development, source: www.c-spars.uk.com/

BRIEF DESCRIPTION OF THE DRAWINGS

FIG. 1 shows a cross section of a female mould;

FIG. 2 shows a cured part with flanges clamped together to form a closed section;

In the the drawings, FIG. 1 shows the cross section of a female mould for a typical sailboat mast in which 1, is the mould, (typically glass reinforced plastic) and 2, is a plywood brace/stand which allows the mould to be turned on its side to facilitate application. The part 3, with turned in flanges 4 & 5, and a material overlap 6, is applied to the mould through the opening 7. After partial or complete curing, an aluminium or similar strip 8, is bonded to the underside of the right flange 5, which is lower than the left flange 4, by an amount equal to the intended thickness of the part.

FIG. 2 shows the cured part 3, removed from the mould with the flanges clamped together to form a closed section. A bonding agent such as epoxy, 9, has been applied between the flanges, and an aluminium or similar sail track 10, has been fastened 11, with suitable fasteners such as pop-rivets or self-tapping or machine screws, through the flanges to the aluminium strip 8, on the inside, pulling the joint closed and creating both a chemical and a mechanical bond. In this example, the double thickness created by the overlap 6 on the leading edge, is balanced by the double thickness of the bonded flanges on the trailing edge to create added stiffness in the fore and aft axis. Added stiffness in the athwartship axis may also be created during the moulding stage by introducing an overlap on the sides or by adding a narrow layer or layers of unidirectional fibres in that area.

FIG. 3 is an example of a simple clamp that can be made from plywood and 2"x4 (50 mm×100 mm) lumber and used to clamp the cured "U" shaped part into the required closed section. It consists of a fixed base and side 1, and a pivoting side 2, which pivots on the bolt & nut 3 and is opened and closed by means of a threaded screw 4, turning in a metal tubing 5. A series of the clamps are arranged at equal intervals along the length of the cured part and are held together longitudinally by the 2"x4" (50 mm×100 mm) lumber 6, which comprises the base and the jaws. A bonding agent is applied to the flanges and the cured part 7, is clamped shut evenly along its length until the flanges 8, are fully overlapped at which point the exterior track can be positioned and fastened.

FIG. 4 shows an alternative method of bonding, whereby the flanges 1, are inserted and clamped into a pre-formed extrusion 2, with a bonding agent such as epoxy 3, and then through fastened 4, with suitable fasteners such as a pop-rivets or self-tapping or machine screws. An added advantage of this method is that the edges of the flanges require no further finishing.

FIG. 5 shows a method of bonding when no exterior attachment is required. Layers 1, of the same or similar material as the part are applied across the flanges 2, and after curing are rounded off at the edges 3, to provide a smooth finish.

Figure 3:
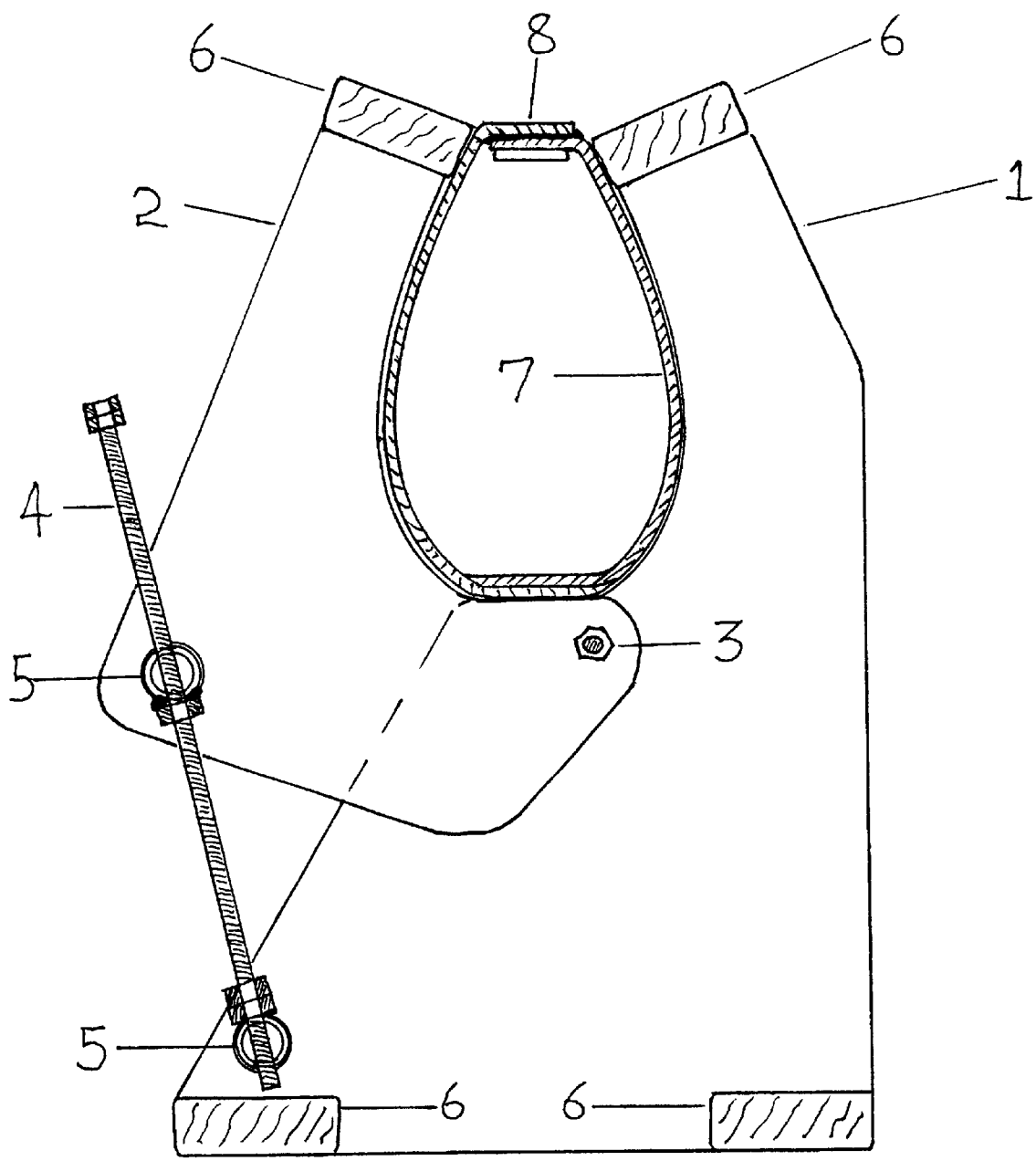
FIG. 3 depicts an external clamp which can be used to clamp flanges together into a closed section.
Figure 4:
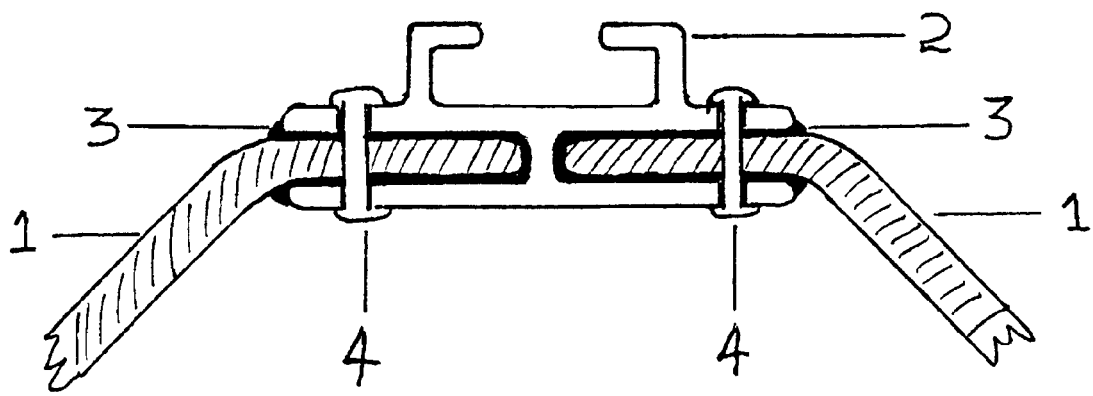
FIGS. 4 and 5 show alternative methods of bringing the flanges into a closed section.
Figure 5:
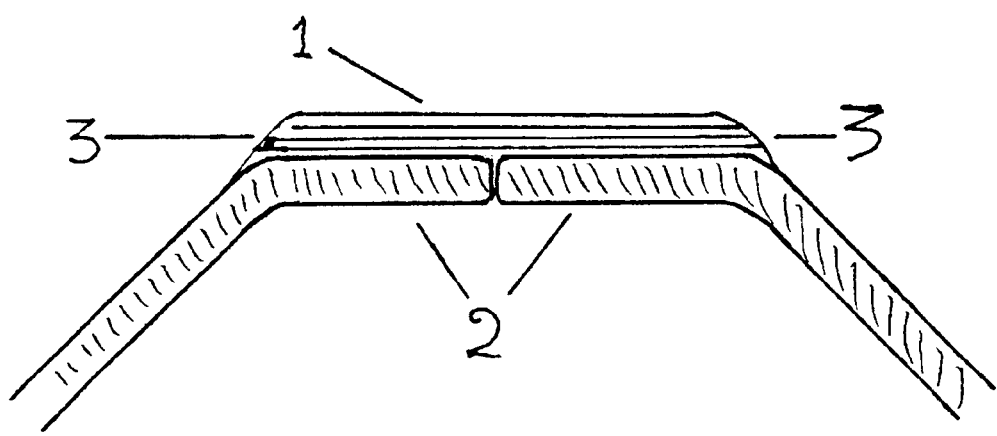

What is claimed is:

1. In a process for manufacturing a fibre-reinforced plastic part selected from the group consisting of masts, spars and columns, using conventional fibre-reinforced plastic moulding techniques such as hand lay-up or automated machinery applications, and conventional materials such as dry or pre-impregnated fibres and hot or cold cure resins, or any combination thereof, the improvement comprising moulding and curing the part (3) in a concave female mould (1) as an open or U-shaped section and subsequently clamping, bonding and/or fastening (8,9, 10, 11) said section into a closed portion.

* * * * *